(12) United States Patent  
Sturm et al.

(10) Patent No.: US 12,479,028 B2  
(45) Date of Patent: Nov. 25, 2025

(54) METAL-ORGANIC-FRAMEWORK-CONTAINING BODIES AND RELATED METHODS

(71) Applicant: ENTEGRIS, INC., Billerica, MA (US)

(72) Inventors: Edward A. Sturm, New Milford, CT (US); Oleg Byl, Southbury, CT (US); Montray Leavy, Singapore (SG); Subhash Guddati, Singapore (SG); Thines Kumar Perumal, Singapore (SG)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 17/584,379

(22) Filed: Jan. 25, 2022

(65) Prior Publication Data

US 2022/0234105 A1    Jul. 28, 2022

Related U.S. Application Data

(60) Provisional application No. 63/141,576, filed on Jan. 26, 2021.

(51) Int. Cl.
| | | |
|---|---|---|
| *B22F 10/14* | (2021.01) | |
| *B29C 64/165* | (2017.01) | |
| *B33Y 10/00* | (2015.01) | |
| *B33Y 70/10* | (2020.01) | |

(52) U.S. Cl.
CPC ........... *B22F 10/14* (2021.01); *B29C 64/165* (2017.08); *B33Y 10/00* (2014.12); *B33Y 70/10* (2020.01); *B01D 2253/204* (2013.01)

(58) Field of Classification Search
CPC ....................................................... B22F 10/14
See application file for complete search history.

(56) References Cited

U.S. PATENT DOCUMENTS

| | | | |
|---|---|---|---|
| 9,370,771 B2 | 6/2016 | Gaab et al. | |
| 9,925,516 B2 | 3/2018 | Fuller et al. | |
| 2002/0129485 A1* | 9/2002 | Mok | B29C 64/188 |
| | | | 29/527.2 |
| 2016/0151762 A1* | 6/2016 | Fuller | B01D 53/02 |
| | | | 502/402 |
| 2016/0243525 A1 | 8/2016 | Song et al. | |
| 2018/0141235 A1 | 5/2018 | Guenster et al. | |

(Continued)

FOREIGN PATENT DOCUMENTS

| | | |
|---|---|---|
| CN | 111976134 B | 11/2021 |
| JP | 2019166655 A | 10/2019 |

(Continued)

OTHER PUBLICATIONS

Ning, Fuda, et al. "Additive manufacturing of carbon fiber reinforced thermoplastic composites using fused deposition modeling." Composites Part B: Engineering 80 (2015): 369-378. (Year: 2015).*

(Continued)

*Primary Examiner* — Jophy S. Koshy  
*Assistant Examiner* — Joshua S Carpenter (57) ABSTRACT

Described are three-dimensional structures that contain metal-organic-framework adsorbent material and that are prepared by additive manufacturing techniques, as well as methods of preparing the structures by additive manufacturing methods.

8 Claims, 7 Drawing Sheets

(56) References Cited

U.S. PATENT DOCUMENTS

| | | |
|---|---|---|
| 2018/0272315 A1 | 9/2018 | Fuller et al. |
| 2019/0217517 A1* | 7/2019 | Erikson .................. B33Y 70/10 |
| 2020/0198179 A1 | 6/2020 | Sugiyama et al. |
| 2021/0008246 A1* | 1/2021 | Ameer .................. B33Y 10/00 |

FOREIGN PATENT DOCUMENTS

| | | |
|---|---|---|
| WO | 2015072147 A1 | 5/2015 |
| WO | 2015169738 A2 | 11/2015 |
| WO | 2015189599 A1 | 12/2015 |
| WO | 2018036997 A1 | 3/2018 |
| WO | 2019055656 A1 | 3/2019 |
| WO | 2020020547 A1 | 1/2020 |

OTHER PUBLICATIONS

Thakkar, Harshul, et al. "3D-printed metal-organic framework monoliths for gas adsorption processes." ACS applied materials & interfaces 9.41 (2017): 35908-35916. (Year: 2017).*

Wenbin Li, Ming C. Leu, Material Extrusion Based Ceramic Additive Manufacturing, Additive Manufacturing Processes, vol. 24, ASM Handbook, Edited By David L. Bourell, William Frazier, Howard Kuhn, Mohsen Seifi, ASM International, 2020, p. 97-111 (Year: 2020).*

Lahtinen, Elmeri, et al. "Selective laser sintering of metal-organic frameworks: production of highly porous filters by 3D printing onto a polymeric matrix." ChemPlusChem 84.2 (2019): 222-225. (Year: 2019).*

Li, Rui, et al. "3D printing of mixed matrix films based on metal-organic frameworks and thermoplastic polyamide 12 by selective laser sintering for water applications." ACS applied materials & interfaces 11.43 (2019): 40564-40574. (Year: 2019).*

Postsynthesis Annealing of MOF-5 Remarkably Enhances the Framework Structural Stability and CO2 Uptake.

* cited by examiner

METAL-ORGANIC-FRAMEWORK-CONTAINING BODIES AND RELATED METHODS

FIELD

The described invention relates to three-dimensional structures that contain metal-organic-framework adsorbent material and that are prepared by additive manufacturing techniques, as well as methods of preparing the structures by additive manufacturing methods.

BACKGROUND

Materials referred to commercially as "metal-organic framework" ("MOF") materials are known to be useful as solid adsorbent materials that are capable of adsorbing gaseous chemical materials for storing and selectively dispensing a gaseous chemical material. Metal-organic-framework materials are one of various general classes or types of adsorbent materials that are effective for these types of adsorbent-type gas storage systems. Other types of adsorbent materials include activated carbon-based adsorbent materials, zeolite adsorbent materials, polymeric adsorption media, silica, among others. With adsorbent-type storage systems, the adsorbent material is typically contained in a storage container such as a storage cylinder, to which a gas, "reagent gas", is added. The reagent gas becomes adsorbed on surfaces of the adsorbent material for subsequent release from the container. The adsorbed reagent gas may be contained in the container in equilibrium with an amount of the reagent gas that is also present in condensed or gaseous form, and the interior of the storage container may be at, above, or below atmospheric pressure.

The gas that is stored on the adsorbent material may be used in a range of industries and industrial applications. Some example gases include gases that are used in processing semiconductor materials or microelectronic devices, such as by: ion implantation, epitaxial growth, plasma etching, reactive ion etching, metallization, physical vapor deposition, chemical vapor deposition, atomic layer deposition, plasma deposition, photolithography, cleaning, and doping, among others, with these uses being included in methods for manufacturing semiconductor, microelectronic, photovoltaic, and flat-panel display devices and products, among others.

In the manufacture of semiconductor materials and devices, and in various other industrial processes and applications, there is a need for reliable sources of highly pure reagent gases provided in safe storage systems. Example reagent gases include silane, germane, ammonia, phosphine, arsine, diborane, stibine, hydrogen sulfide, hydrogen selenide, hydrogen telluride, digermane, acetylene, methane, and corresponding and other halide (chlorine, bromine, iodine, and fluorine) compounds. The gaseous hydrides arsine ($AsH_3$) and phosphine ($PH_3$) are commonly used as sources of arsenic (As) and phosphorous (P) in ion implantation. Due to their extreme toxicity and relatively high vapor pressure, the use, transportation, or storage of these gases raises significant safety concerns. These gases must be stored, transported, handled, and used with a high level of care and with many safety precautions. Adsorbent-based storage systems are often used for storing and delivering these types of reagent gases.

In recent years, metal-organic-framework adsorbent materials have received extensive interest in gas capture, gas purification, and gas storage and delivery applications. Scientists have synthesized thousands of chemically different MOF materials over the past 20 years, and many of these have very high surface areas and the ability to reversibly adsorb large amounts of commonly used reagent gases, including gases used in ion implantation and other processes used in semiconductor and microelectronic device manufacturing.

While MOF adsorbents are effective in adsorbent-type storage applications, certain features of MOFs do not compare favorably to features of other types of adsorbent materials. For example, MOFs are known to be less physically stable and more prone to degradation (e.g., thermal degradation) compared to other types of adsorbent materials, e.g., zeolites, and also can be susceptible to physical degradation when handled and transported.

As another weakness, MOFs are known to exhibit a lower packing density (e.g., grams MOF per volume of MOF adsorbent material) compared to other adsorbent materials. MOFs generally have a relatively low density compared to various other types of adsorbent materials, such as a density of from one-fourth to one-third of a density of monolithic ("puck-shaped") carbon-based adsorbent materials. As a result, even though a measured gravimetric adsorption capacity of a MOF may be greater than that of carbon, the lower-density MOF structure cannot be contained within a fixed volume container in an amount (based on density) that is sufficient to equal the working capacity of many carbon-based adsorbent materials.

Many MOFs can only be synthesized as powders or loosely bound extruded pellet structures that are very friable. These structures may be susceptible to physical degradation during transportation and use, such as by shedding small particulates. A result may be the presence of fine particles of the MOF material within a storage container that contains the MOF adsorbent material. The MOF particles may escape the storage container with reagent gas delivered from the container and may flow downstream to a location of use of the reagent gas, interfere with the operation of valves and flow controllers downstream, or may instead clog a filter designed to prevent downstream flow of the particles.

Attempts have been made to produce higher density MOFs to realize potential benefits of these crystalline materials by boosting the volumetric capacity of the MOFs and by minimizing the possible shed of particles. Investigators have attempted to densify MOFs using compressive consolidation, binder- or solvent-assisted extrusion, polymer binding, and MOF binder scaffolding. All of these approaches have evident shortcomings. For example, attempts to densify MOFs by use of compressive force have been hindered by the tendency of open cage structures of said MOFs to deform or collapse under elevated compressive load.

SUMMARY

In one aspect, the invention relates to a method of forming a multi-layer metal-organic-framework composite by additive manufacturing. The method includes: forming a first feedstock layer on a surface, the feedstock layer comprising feedstock that includes metal-organic-framework adsorbent; selectively forming solidified feedstock on portions of the first feedstock layer; forming a second feedstock layer over the first feedstock layer, the second feedstock layer comprising feedstock that includes metal-organic-framework adsorbent; selectively forming second solidified feedstock comprising the metal-organic-framework adsorbent on portions of the second feedstock layer, wherein the combination for the first and second feedstock layer creates a multilayer composite that contains non-denatured metal-organic framework adsorbent.

In another aspect, the invention relates to a method of forming a multi-layer metal-organic-framework composite by additive manufacturing. The method includes: providing feedstock that contains metal-organic-framework adsorbent and binder composition; selectively applying the feedstock to a surface to form a path of the feedstock on the surface, the path having an upper path surface; causing the feedstock of the path to solidify; then applying the feedstock to the upper surface to form a second path of the feedstock on the second surface.

In yet another aspect, the invention relates to feedstock for use in additive manufacturing. The feedstock contains: metal-organic-framework adsorbent, and binder composition that comprises polymer.

DETAILED DESCRIPTION

As follows is a description of methods that are useful to prepare MOF-containing three-dimensional structures by additive manufacturing methods, including methods that are commonly referred to as "3-D printing" techniques. Different varieties of additive manufacturing techniques are known. Specific examples are those commonly referred to as "powder-bed" additive manufacturing methods, which include various "binder jet printing" techniques. Other examples include stereolithography techniques (SLS) and "feedstock dispensing methods" (FDMs). Methods and materials that are described herein are described in terms of these exemplary varieties.

The methods involve additive manufacturing steps that individually and sequentially form multiple layers (e.g., "paths") of solidified feedstock composition that contains MOF particles dispersed in solidified binder composition, with the solidified binder composition acting as a structure that holds the MOF particles together within the solidified feedstock composition. Using a series of additive manufacturing steps, the multiple layers of solidified feedstock are sequentially formed into a multi-layer MOF composite made from the layers of solidified feedstock.

The multi-layer MOF composite (or "MOF composite" or "composite" for short) contains MOF particles that are adapted to adsorb and desorb reagent gas as part of an adsorbent-based storage system.

As a raw material, the MOF particles are in particle form, such as a powder, and exhibit desired adsorption and desorption functionality. In the form of the MOF composite, however, the MOF particles have been combined with other materials. The multi-layer MOF composite that initially results from the additive manufacturing steps is a structure that may commonly be referred to as a "green body." The multi-layer MOF composite in the form of a green body contains materials that are useful or required for the additive manufacturing steps, such as various components of a binder composition. Some materials of the MOF composite that were used to prepare the MOF composite but that are unnecessary for the desired functioning of the MOF particles as adsorbent material, may be removed from the multi-layer MOF composite, or, alternately, may be otherwise processed to be further hardened or cured. Removing or processing those materials of the MOF composite will improve the functioning of the MOF particles as an adsorbent material for use in an adsorbent-type storage system.

Thus, a MOF composite that is initially formed by an additive manufacturing technique may be further processed to remove solidified binder composition, to improve mechanical properties, including but not limited to, mechanical strength, flexural strength, geometric stability, and/or resistance to wear of the multi-layer MOF composite, or both. In example steps of processing the multi-layer MOF composite, the composite may be processed by any one or more of: a debinding step also known as to remove solidified binder or a portion thereof, by contact with solvent, by contact with a gas (e.g., for gas etching), or by exposing the composite to elevated temperature to cause the binder or the composite to be hardened, cured, or sintered.

For preparing a multi-layer MOF composite as described, certain types of additive manufacturing methods that are well known in the relevant art have been found to be useful or advantageous. Generally, additive manufacturing processes are known to be useful for preparing structures that exhibit a broad range of shapes and sizes. Additive manufacturing can also enable printing of complex microstructures, potentially with fine channels for enhancing gas penetration with controlled pressure drop. Additive manufacturing processes may also be highly automated and relatively efficient and cost-effective.

Additionally, certain types of additive manufacturing methods may be effective to produce a multi-layer MOF composite that retains useful functionality (e.g., as an adsorbent) of the MOF particles, i.e., the MOF does not become physically altered or "denatured" during the additive manufacturing step but retains an original physical (chemical, molecular) form that allows use of the MOF to reversibly adsorb and desorb reagent gas.

Optionally and preferably, according to certain useful or preferred examples, methods as described may produce a MOF composite that includes a relatively high amount by weight of MOF particles per volume of the MOF composite (i.e., "MOF density"). Example MOF densities that may be achieved by methods as described may allow a MOF composite to be further processed to produce a MOF adsorbent material that exhibits a MOF density that is relatively higher than MOF densities of previous MOF adsorbent materials prepared by past methods. Useful and preferred MOF composites may be formed to contain an amount of MOF particles of at least 0.65 grams MOF particles per cubic centimeter MOF composite, preferably at least 0.85 grams MOF particles per cubic centimeter MOF composite, and most preferably at least 1.00 grams MOF particles per cubic centimeter of MOF composite.

According example embodiments of the invention, an additive manufacturing technique may be used as described to produce a multi-layer MOF composite in a manner that retains the desired functionality of the MOF particles, meaning without substantially denaturing the MOF particles in a manner that reduces the ability of the MOF particles to adsorb and desorb reagent gas as needed to function as part of an adsorption-type storage system. During steps of the desired additive manufacturing process, the MOF materials retain physical, chemical, and molecular structures that allow the MOF material to function as an adsorbent material; i.e., the additive manufacturing step does not cause the MOF to become denatured and inactivated as an adsorbent material. MOF materials, for the purpose of this invention, can include all Metal Organic frameworks known in the art.

To prevent denaturing of the MOF, i.e., physical, chemical, or molecular degradation of the MOF molecules and loss of desired functionality of MOF particles, preferred steps of preparing the multi-layer composite by an additive manufacturing technique may include steps that avoid exposing the MOF particles to a temperature that can range from 125° C. to 350° C., preferably 180° C. to 325° C. and most preferably 250° C. to 300° C., or 300 degrees Celsius or above. Further, it is preferable not expose the MOF particles to a temperature that is greater than 250 or 200 degrees Celsius. Also, it may be desirable to prevent or minimize exposure of the MOF adsorbent particles to room air and moisture during the additive manufacturing process.

Useful metal-organic-framework (MOF) adsorbent materials exhibit various physical and molecular forms. Metal-organic frameworks are organic-inorganic hybrid crystalline porous materials that have molecular structures that include a regular repeating array of positively charged metal ions surrounded by organic "linker" molecules. The metal ions form nodes that bind the arms of the organic linker molecules together to form a repeating, hollow cage-like structure. With this hollow structure, MOFs have an extraordinarily large internal surface area that can be adapted for use to adsorb (and selectively desorb) reagent gas in an adsorbent-type storage system. These features of the MOF molecules must be retained, not substantially disrupted or damaged, during a useful additive manufacturing process for forming a multi-layer MOF composite.

The MOF adsorbent may be any known or future-developed MOF adsorbent. Metal organic framework adsorption media are known and differ from other types of adsorption media such as carbon-based adsorption media, polymeric adsorption media, zeolites, silica, etc. Metal organic frameworks (MOFs) are nanoporous materials consisting of organic linkers coordinated to metal ions in crystalline structures. A subclass of MOFs, known as zeolitic imidazolate frameworks (ZIFs), consist of metal (mainly tetrahedral Zn2) bridged by the nitrogen atoms of imidazolate linkers. Various MOF adsorbent materials are known in the reagent gas, reagent gas storage, and gas separations arts. Certain examples of MOF materials are described in U.S. Pat. No. 9,138,720, and also in United States Patent Application Publication 2016/0130199, the entireties of each of these documents being incorporated herein by reference.

A MOF as described may be included alone as an adsorbent material of a multi-layer composite, or may be present in combination with one or more other types of adsorbent materials. Any of various types of adsorbent materials may be useful in combination with a MOF, as adsorbent material of a composite. Example non-MOF adsorbents include: carbon-based materials (e.g., activated carbon), silicalites, polymer framework (PF) materials, porous organic polymers (POP), as well as others. Adsorbent may be in any size, shape, or form, such as granules, particulates, beads, pellets, or shaped monoliths.

In certain examples, a multi-layer MOF composites may contain MOF as the only type of adsorption material present. In certain example methods and MOF composites, a multi-layer MOF composite can contain substantially at least 50, 80, 90, 95, or 97 percent or entirely MOF adsorption media based on a total amount of adsorption media. Other (non-MOF) types of adsorption media are not required and may be excluded from materials and MOF composites of the present description. In other words, the total amount of adsorbent material that is contained in an ingredient of a process (e.g., feedstock) or in a multi-layer MOF composite, may comprise, consist essentially of, or consist of MOF-type adsorption media.

According to the present description, a composition that consists essentially of a specified material or combination of materials is a composition that contains the specified material or materials and not more than an insignificant amount of any other material, e.g., not more than 2, 1, 0.5, 0.1, or 0.05 percent by weight of any other material. For example, a MOF composite that contains adsorbent material that consists essentially of MOF adsorption media (e.g., MOF particles) refers to a MOF composite that contains MOF adsorption media (e.g., MOF particles) and not more than 2, 1, 0.5, 0.1, or 0.05 percent by weight of any other type of adsorption media, based on total weight adsorption media in the MOF composite.

In other examples, a composite may contain multiple different types of adsorbent, including at least one MOF-type adsorbent. For example, a composite may contain a combination of multiple adsorbent materials present within a fairly uniform packed composite fulfilling different pore size requirements. The different multiple adsorbent materials may differ in surface area, pore size distribution, or other technical parameters. For example, a pore size ration between different MOF composites can range from about 1.5:1 to 10:1, other applications may require a pore size ration of 2:1 or 3:1 Example composites may contain a first MOF ("MOF A") in combination with a second MOF ("MOF B") and even an optional third MOF ("MOF C"). Other examples may contain a first MOF ("MOF A") and an optional second MOF ("MOF B"), in combination with one or more non-MOF adsorbent materials such as a carbon-based adsorbent material ("Carbon A") optionally with a second carbon-based adsorbent material ("Carbon B"). Other combinations include one or more MOF adsorbents with a zeolite, a polymer framework (PF) adsorbent material, a porous organic polymers adsorbent material (POP), or two or more of these. Examples of such MOF adsorbents include but are not limited to, are Zr-MOFs (metal-organic frameworks having zirconium oxide nodes), ZIF-like MOFs (zeolitic imidazolate frameworks), and/or zinc-based MOFs. A combination of MOF adsorbent and non-MOF adsorbent may be used in any useful relative amounts, such as from 90:10 to 10 to 90 (wt:wt MOF to non-MOF), or from 75:25 to 25 to 75 (wt:wt MOF to non-MOF), or from 60:40 to 40 to 60 (wt:wt MOF to non-MOF). Different combination of multiple adsorbent materials depends on the adsorption or desorption performance desired which includes but not limited to kinetics, stability, heat adsorption, efficiency of delivery and similar parameters.

Additive manufacturing processes for forming a multi-layer MOF composite require ingredients that include MOF adsorption media (e.g., MOF particles) and one or more ingredients that combine to form a binder composition. The binder composition may be combined with the MOF particles, and the binder composition may be solidified (hardened, cured, or the like) to produce a solidified feedstock composition that contains solidified binder composition acting as a physical support structure (matrix) for the MOF particles. Steps of combining MOF particles with the binder composition and causing the binder composition to solidify as a layer of a MOF composite may vary with different types of additive manufacturing techniques, e.g., steps of combining MOF particles with binder composition may be different for powder-bed techniques, and for different versions of powder-bed techniques, compared to stereolithography and feedstock dispensing methods. The ingredients of the binder composition may also be different for different types of additive manufacturing techniques.

In general, binder composition may include any material that is capable of being solidified as part of a feedstock composition, or by being added to a feedstock layer, to selectively form solidified feedstock at portions of a feedstock layer. Examples generally include organic materials such as polymers (e.g., synthetic polymers or natural polymers, either of which may optionally be chemically curable), inorganic materials such as clays and other inorganic particles, fugitive materials, etc. In certain embodiments the synthetic polymers include but are not limited to nylon, polyethylene, and PLA (polylactic acid, & PVA (polyvinyl alcohol).

One example of a type of material that can be useful as a binder composition, or component thereof, is non-polymeric, inorganic particles such as a clay, that can be suspended in a liquid and dried by removal of the liquid to form a solid material. A useful clay or other inorganic particle-type binder ingredient may be combined with MOF particles and polymer (e.g., water-soluble or water-dispersible polymer) in a manner by which the inorganic particles and the MOF particles can become suspended together in a liquid (e.g., water, organic solvent, or a combination of both), with the polymer, followed by removal of the liquid, e.g., by evaporation. Upon removal of the liquid, the inorganic particles and the polymer form a solidified binder composition that supports the MOF particles as part of a solidified feedstock composition.

Other binder compositions include curable polymeric binder materials. Curable polymeric binders, in the form of a liquid, may be combined with MOF particles as a liquid. The feedstock layer may be formed from the liquid polymeric binder and MOF particles, with the binder being combined with the MOF particles before forming the feedstock layer or while forming the feedstock layer. The curable polymeric binder contained in the feedstock layer may be solidified. Examples include thermoplastic polymers that may be reversibly heated to form a liquid and then cooled to form a solid (e.g., may be reversibly melted and solidified). Alternately or additionally, a polymeric binder material may be chemically curable, for example by exposure to elevated temperature (thermosetting) or by exposure to electromagnetic radiation such as from a laser, e.g., a UV laser. Other examples of polymeric binders may be applied as a liquid, within a liquid solvent, and the solvent may then be evaporated to leave the polymeric binder as a structure that supports the MOF particles; the polymer may optionally be subsequently cured by a chemical reaction that is initiated by heat (increased temperature), exposure to radiation, or by another reaction mechanism.

Curable liquid binder compositions may include curable materials that contain chemical monomers, oligomers, polymers, cross-linkers etc., and may additionally contain minor amounts of functional ingredients or additives that allow for or facilitate flow or curing of the curable binder composition. These may include any of: a flow aid, a surfactant, an emulsifier, a dispersant to prevent particle agglomeration, and an initiator to initiate cure of the polymer when exposed to electromagnetic (e.g., ultraviolet) radiation or an elevated temperature.

In additive manufacturing techniques referred to as "powder-bed" techniques, which include various techniques referred to as "binder-jet printing" techniques, MOF particles are contained in a bed of "feedstock" that can be formed into uniform layer, known as a "feedstock layer." The feedstock layer contains MOF particles and may optionally include one or more additional ingredients, such as one or more components of a binder composition. Other optional ingredients may include flow aids or polymeric spacer particles. These methods cause a binder composition, one or more components of which may be included in the feedstock layer or selectively applied to portions of the feedstock layer, to solidify to form a solidified binder composition at selected portions (areas) of the feedstock layer. The mechanism by which the binder composition (or separate portions thereof) becomes located at the selected portion of the feedstock layer, and the mechanism by which the binder composition at the selected portion of the feedstock layer becomes solidified, may vary.

Powder-bed additive manufacturing technique can involve, in general terms, a sequence of multiple individual layer-forming steps, each step being used to form a single cross-sectional layer of a multi-layer MOF composite. After forming a first (bottom) layer, each subsequent layer is formed on a top surface of a preceding layer. This series of multiple individual layer-forming steps is effective to form a multi-layer MOF composite of multiple individually-formed layers of solidified feedstock.

These techniques, like other additive manufacturing techniques, produce objects that are described or defined by digital data such as a CAD (computer-aided design) file. A three-dimensional object is sequentially built up, layer-by-layer, using a series of individual steps that combine to produce a composite body ("multi-layer MOF composite") made of many thin cross sectional layers of solidified feedstock. Each layer-forming step may include forming on a surface a single feedstock layer that includes feedstock that contains MOF particles. In some example methods, the feedstock layer may contain binder composition or a component thereof. In other example methods, a feedstock layer does not contain binder composition or a component of a binder composition; in these methods the binder composition is selectively added to portions of the feedstock layer. In any of the described methods, the multiple layers of a composite may be formed using one single type of adsorbent or a combination of two or more different types of adsorbents (one or more MOFs, or one or more MOFs with another type of adsorbent) in all layers of the composite, or alternately by using different adsorbent materials in different layers. Likewise, the multiple layers may be formed using non-adsorbent ingredients that are the same in each layer, or different in different layers, such as by using the same binder composition in different layers or by using different binder composition in different layers of a MOF composite.

By one example, a roller or other spreading device uniformly applies an amount of a feedstock composition in the form of a powder over a surface, either by applying a single amount of a powder feedstock composition in a single pass, or by applying multiple separate amounts of powder feedstock with multiple passes over the surface. The "feedstock layer" may be formed from a feedstock composition by one or multiple steps of applying a powder feedstock composition to the surface and using a roller or other application method to form a smooth, uniform feedstock layer having a desired and useful depth.

A useful depth (thickness) of a feedstock layer can depend on various factors such as particle size of MOF particles in the feedstock layer, desired properties (quality, e.g., surface finish, layer density, dimensional accuracy) of a solidified feedstock layer, and the resolution of a printhead or other device used to apply a liquid material to the feedstock layer. Desirably, a feedstock layer thickness may be at least 2 or 3 times a diameter (D50) of MOF particles in the feedstock. A typical thickness of a useful feedstock layer may be in a range from 25 microns to 200 microns.

After forming a feedstock layer, portions of the feedstock layer are selectively processed to form solidified feedstock layer. Following these steps to form solidified feedstock composition, an additional thin layer of the powder feedstock composition is spread over the top surface of the completed layer, which contains the solidified feedstock surrounded by an amount of non-solidified (original) feedstock composition.

The process is repeated to form multiple layers that contain the solidified feedstock, with each new layer (after the first layer) of solidified feedstock being formed on and adhering to a previous layer of the solidified feedstock. Multiple feedstock layers are deposited and multiple layers of solidified feedstock are formed, successively, one over each completed layer, to form the multi-layer MOF composite. After all layers of the multi-layer MOF composite have been deposited, the portions of the feedstock layers that contain the original feedstock material that has not been used to prepare solidified feedstock may be separated away from the multi-layer MOF composite.

If desired or useful, a feedstock layer used in a powder bed additive manufacturing technique may contain one or more optional ingredients that are either part of a binder composition or otherwise useful as part of the solidified feedstock layer. These may include, for example, a flow aid to improve flow of the feedstock within the printer bed, to improve the ability of the feedstock to form an even (uniform, level, homogeneous) feedstock layer. Alternately or in addition, the feedstock layer may optionally contain solid polymer material that acts as a spacer between the MOF particles, e.g., that acts as a "pore-forming" material. Such a solid polymer may be a thermoplastic (in solid form at room temperature) pore-forming polymer, and may be present in the feedstock layer in any desired amount, such as in an amount of from 0.5 to 25 weight percent based on total weight feedstock, e.g., from 1 to 20 or from 2.5 to 15 weight percent based on total weight feedstock, with the balance of the feedstock (by weight) being MOF particles. Alternatively, on a volume basis, the preferred percentage would be 3-30%, or 5-25%, or 10-20%.

In more detail, one specific example of a powder-bed techniques is referred to as "jet binder printing." In these methods, the feedstock layer contains the MOF particles and may or may not include binder composition or a component of a binder composition.

The solidified feedstock layer is formed by selectively applying a liquid material to portions of the feedstock layer to selectively form solidified feedstock composition at portions of the feedstock layer. A printhead or other device that is effective to selectively dispense and apply a desired amount of the liquid to the feedstock layer moves over the upper surface of the feedstock layer. The printhead or other useful device ejects the liquid and applies the liquid at selected portions of the top surface of the feedstock layer. The liquid flows into the feedstock layer and is useful to form solidified binder composition at the locations of the feedstock layer at which the liquid is selectively applied. The solidified feedstock composition contains the MOF particles dispersed throughout the solidified binder composition.

Within this general description of jet binder techniques, different variations also exist. According to one variation, the feedstock layer contains MOF particles and a binder composition or portion of a binder composition, and the liquid that is selectively applied to the feedstock layer is a liquid that is useful in a step of causing the binder composition or component thereof in the feedstock layer to solidify.

With more exemplary detail, but without limiting the present description, this type of method may use feedstock that contains MOF particles and a component of a binder composition that will become dissolved, suspended, or otherwise activated when contacted with the ejected liquid, after which the combined binder composition may become solidified as a matrix surrounding the MOF particles.

The component of the binder composition that is included in the feedstock may be organic, such as a polymer (e.g., polyvinyl alcohol) or a phenolic resin, or may be inorganic, such as an inorganic particle such as clay. The liquid may be a liquid that is effective to dissolve, disperse, or chemically react with the binder composition that is initially present in the feedstock layer. In some examples, the liquid or a portion of the liquid may subsequently be removed (e.g., evaporated) to leave behind a solidified feedstock composition that includes solidified binder composition as a matrix structure that surrounds and supports the MOF particles.

According to one very specific example of this type of a system, the feedstock layer may contain MOF particles, dispersible inorganic particles such as clay, e.g., Bentonite clay, combined with an amount of polymer (e.g., polyvinyl alcohol). The liquid that is selectively applied to portions of the feedstock layer may include liquid that is effective to disperse the MOF particles, inorganic particles, and polymer, and then be evaporated or otherwise removed. The liquid may be or may include one or more of solvent, which may be an organic solvent such as ethanol, water, or a combination of these. The feedstock layer may be solidified by application of thermal or radiation energy. Example amounts of the different components in the feedstock layer after the liquid is applied may be at least 70 weight percent MOF particles (e.g., from 70, 80, 85, or greater than 85 weight percent MOF particles), and from 15 to 30 weight percent polymer (e.g., polyvinyl alcohol), Bentonite clay, water, and organic solvent (e.g., ethanol), based on total weight feedstock and added liquid.

As a different variation of a powder-bed additive manufacturing technique, a feedstock layer does not contain (or does not require) any ingredient that is part of a binder composition. In this variation, the liquid that is selectively applied to the feedstock layer may include all necessary ingredients of a binder composition, which may be in the form of a thermoplastic or chemically curable polymer, in liquid form. In this variation, the liquid binder composition is selectively applied to the feedstock layer and is allowed or caused to solidify in place to produce the solidified feedstock layer.

According to examples of this type of a system, the feedstock layer may contain adsorbent material (e.g., one or more types of MOF particles optionally in combination with one or more non-MOF adsorbent) and need not contain any other material. E.g., the feedstock layer may contain at least 70, 80, 90, or 95 percent by weight MOF particles. Alternately, a feedstock layer may contain at least 70, 80, 90, or 95 percent by weight adsorbent materials that include a portion of one or more MOF adsorbent material particles in combination with one or more non-MOF adsorbent material particles. A combination of MOF adsorbent and non-MOF adsorbent may be in any useful relative amounts, such as from 90:10 to 10 to 90 (wt:wt MOF to non-MOF), or from 75:25 to 25 to 75 (wt:wt MOF to non-MOF), or from 60:40 to 40 to 60 (wt:wt MOF to non-MOF). Other ingredients may be desired, however, such as pore-forming particles, flow aids, and the like, as described herein.

The liquid binder composition that is applied to the feedstock layer can include all ingredients of a binder composition that are necessary to selectively dispense and apply the binder composition in liquid form to a feedstock layer, and also for the liquid binder composition to become solidified as part of a solidified feedstock composition. The liquid binder may, for example, contain polymeric material that can be solidified by any of a chemical curing mechanism (by exposure to electromagnetic radiation), by a reduction in temperature, or by removal of solvent by evaporation.

Yet another variety of an additive manufacturing technique is referred to as stereolithography. This method uses steps and equipment similar to powder-bed techniques. By these techniques, the feedstock layer contains MOF particles dispersed in a curable liquid binder composition. The feedstock layer can be contained in a shallow bed, as with binder jet techniques. Multiple layers of solidified feedstock composition are successively formed by each layer being selectively cured (solidified) by exposure to electromagnetic radiation such as ultraviolet (UV) radiation. Compared to selectively applying liquid to a powder feedstock layer to cause the feedstock layer to solidify (as described supra with respect to jet binder techniques), stereolithography techniques selectively solidify (cure) portions of a liquid feedstock layer by exposing those portions of the feedstock layer to electromagnetic radiation, which induces chemical curing.

Yet another additive manufacturing process that may be useful as described herein is referred to as "selective laser irradiation" or "SLI." This process is similar to stereolithography but instead of a liquid curable feedstock used in stereolithography, a selective laser irradiation method uses a feedstock that contains binder in the form of a solid material, e.g., a powder, in combination with MOF particles. The binder may be a thermoplastic or a radiation-curable polymer. If a thermopolymer, the binder can be heated by the laser to melt and can then cool to become re-solidified as solidified feedstock. Alternately, solid (powder) binder contained in the feedstock may be include radiation-curable polymer that is caused to react and polymerize when irradiated by the laser, to form solidified feedstock.

In addition to powder-bed and stereolithography additive manufacture techniques, other additive manufacturing techniques may also be useful to prepare a multi-layer MOF composition also include non-powder-bed techniques. One example is referred to as the "feedstock dispensing method" (FDM). By this technique, no feedstock layer is prepared within a bed and then selectively solidified by selective contact with a liquid (by jet binder techniques) or selective irradiation (stereolithography). Instead, a flowable (liquid) feedstock material that contains both MOF particles and binder composition is selectively applied to a surface as a path or layer, with multiple successive applications forming a series of successive layers of the solidified feedstock composition.

The feedstock may contain a binder as described herein, which may be polymeric (e.g., curable or thermoplastic), inorganic (e.g., inorganic particles), etc. If the binder contains radiation-curable polymer, the feedstock may be solidified by exposing the binder to electromagnetic radiation. If the binder is inorganic, the feedstock may be solidified by exposure to elevated temperature, e.g., to remove solvent.

The feedstock that is selectively applied to the surface, e.g., by ejection through a printhead or other effective device, contains all components of the solidified feedstock layer. The binder composition of the liquid feedstock material may, for example, contain polymeric material that can be solidified by a chemical curing mechanism such as by exposure to light or irradiation, exposure to elevated temperature, or alternately by removal of solvent from the liquid feedstock material. In other examples, the binder composition of the liquid feedstock material may be a thermoplastic material that is heated above a melting temperature to be formed as a path or layer of feedstock and is subsequently cooled to produce the solidified feedstock composition. Example feedstock compositions can contain a binder component and polymer, and is a flowable material that may be considered a semi-solid feedstock or a viscous liquid.

As a single non-limiting example of one type of feedstock that may be useful in a feedstock dispensing method, a useful feedstock may contain a combination of MOF particles, inorganic particles, polymer, and liquid that includes water and organic solvent, as each of these different ingredients are generally and specifically described elsewhere herein. The feedstock may be a flowable material that contains at least 70 weight percent MOF particles (e.g., from 70, up to 80, 85, or more than 85 weight percent MOF particles), and from 15 to 30 weight percent (in total, combined): polymer (e.g., polyvinyl alcohol), inorganic particles (e.g., Bentonite clay), water, and organic solvent (e.g., ethanol), based on total weight feedstock.

Each of these different types of additive manufacturing techniques described herein for use in preparing a multi-layer MOF composite will require a binder composition, MOF particles (e.g., in the form of a powder or collection of particles), and useful equipment for carrying out the additive manufacturing steps. The equipment may be an automated 3D printer that is capable of forming the MOF composite by a powder bed technique (generally), a jet binder printing technique, a stereolithographic printing technique, a filament deposition method, or another useful additive manufacturing method. Useful equipment and related methods will be effective to place multiple layers of solidified feedstock, sequentially, one over a preceding layer, to form the multi-layer MOF composite. Importantly, the method of preparing the multi-layer MOF composite is selected to avoid any processing of the MOF particles that would cause the MOF particles to become ineffective as an adsorbent material of an adsorbent-type gas storage system, e.g., by physical or chemical degradation, such as due to exposure to high temperature.

Figure 1A:
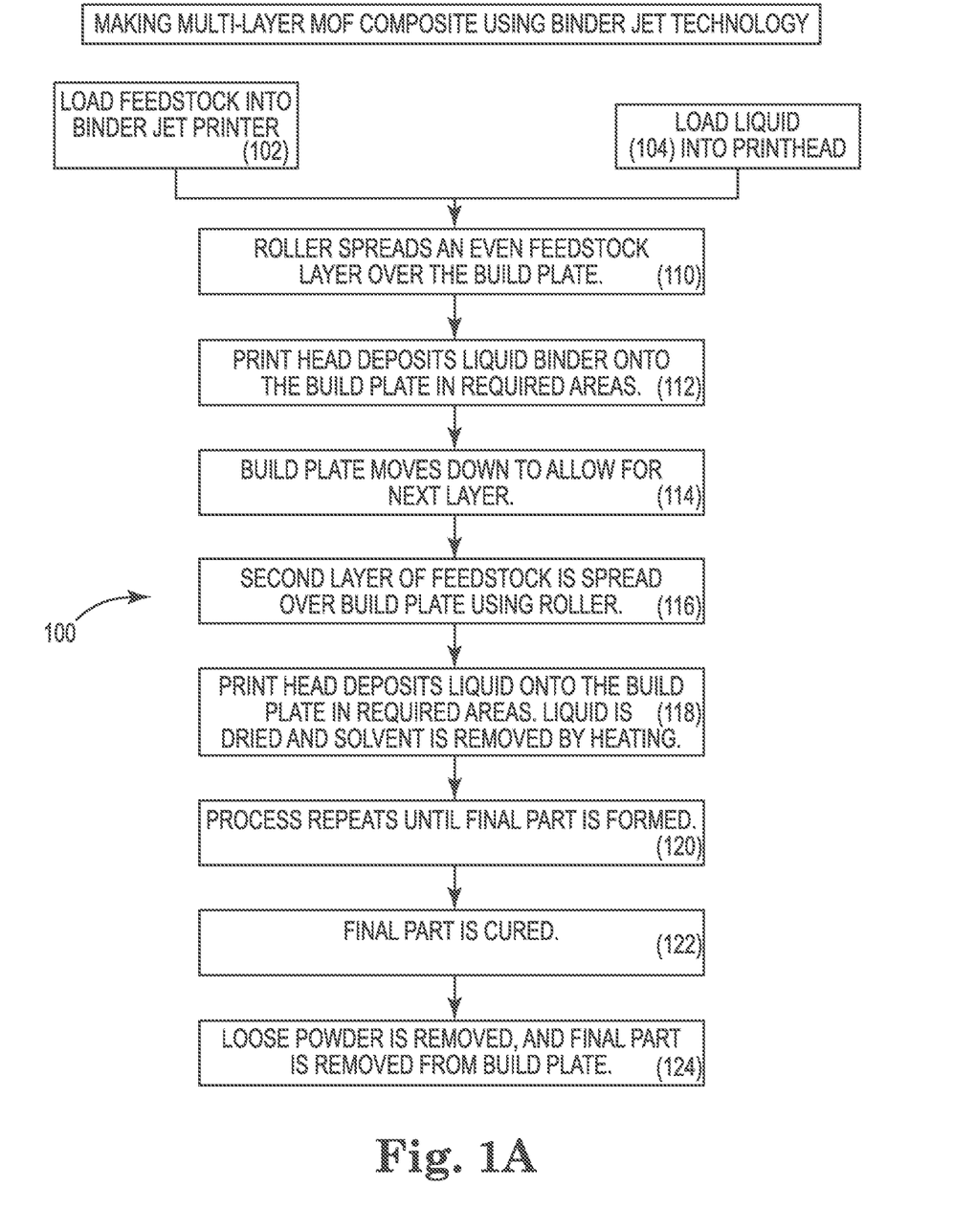
FIGS. 1A, 1B, 2A, 2B, 3A, 3B, 4A, 4B, and 4C show example steps of methods as described of forming a multi-layer MOF composite by additive manufacturing techniques.
Figure 1B:
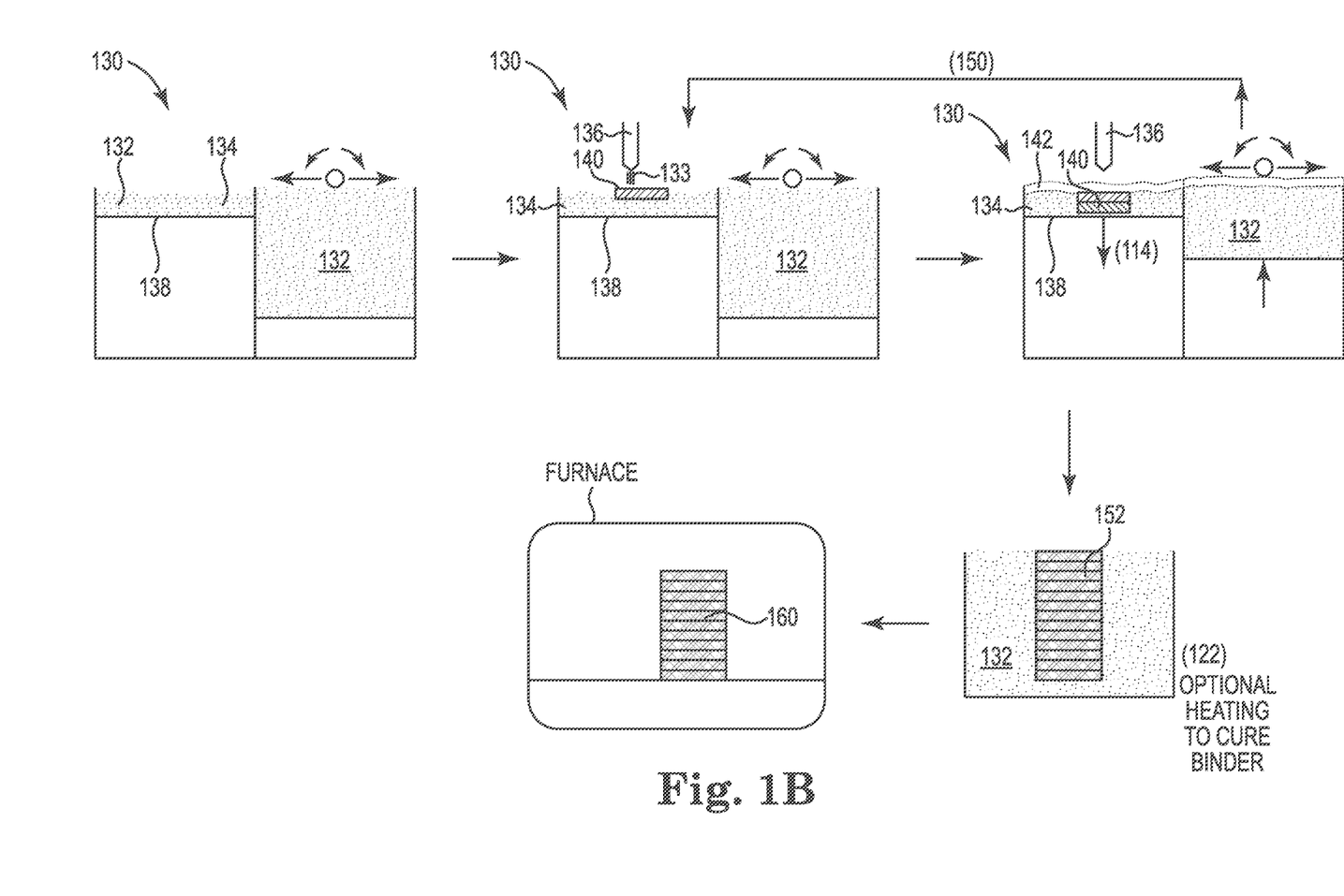

Examples of a binder jet printing additive manufacturing technique (100) useful for preparing a multi-layer MOF composite are shown at FIGS. 1A and 1B.

FIG. 1A illustrates a sequence of steps of a useful binder jet printing additive manufacturing technique, and identifies that the method can be used, independently, with different forms of feedstock 102 loaded at a printer bed of an additive manufacturing system, and with different liquids 104 loaded at a printhead of the additive manufacturing system.

Feedstock 102 is a powder that contains MOF particles and optional additional ingredients. In example methods, feedstock 102 does not contain binder composition or a component thereof (e.g., does not require binder composition or a component thereof), and liquid 104 contains binder composition. In other example methods, feedstock 102 does contain binder composition or a component of binder composition, and liquid 104 contains a liquid ingredient that is effective to cause the binder composition in the feedstock to solidify.

The following describes a system and method by which a binder composition that contains curable polymeric material is ejected from the printhead at selective portions of a feedstock layer, to effect solidification of the selected portions of the feedstock layer. The process can be performed using commercially available binder jet printing apparatus, MOF particles as described herein, and with liquid (heated thermoplastic) polymeric binder (104) dispensed from a printhead of the apparatus.

According to example steps of the method (FIG. 1A), feedstock (102) is loaded into a bed of a powder-bed additive manufacturing system and is formed as an even feedstock layer of a desired depth, over a build plate of the apparatus (110). In a subsequent step (112), a print head selectively deposits liquid binder (104) onto a portion of the first layer. The liquid binder (104) may be solidified after being placed onto the feedstock layer. For example, liquid binder (104) may contain polymer that is dissolved or dispersed in a liquid solvent that can be removed to cause the polymer to solidify. After the liquid binder (104) is selectively applied to the feedstock layer, the liquid binder (104) can be solidified, e.g., by applying heat to the liquid binder to remove solvent from the binder and form solidified feedstock at the portion. Alternately, liquid binder (104) may be a thermoplastic that can be melted, applied to the feedstock layer, and then cooled to solidify. Alternately, the liquid binder (104) may be a curable polymer that can be applied to the feedstock layer in liquid form and then reacted chemically to solidify.

The liquid binder is applied to the feedstock layer in an amount that is effective to fix the positions of the MOF particles of the feedstock layer. The method does not require that the liquid binder be applied in an amount or manner to fill spaces between MOF particles of the feedstock, but may be applied in an amount that connects or "bridges" adjacent or nearby particles in the powder feedstock layer to cause the positions of the particles to be fixed relative to other MOF particles, without necessarily filling void spaces of the feedstock layer. The "solidified" feedstock is "solid" in a sense of being stiffened, rigid, or hardened sufficiently to act as a structure that supports and maintains the positions of the MOF particles, but may also contain openings, void spaces, or pores between the connected particles. The solidified feedstock, for example, may include MOF particles that are connected by a dried, cured, or otherwise continuous (but not necessarily solid, meaning without pores) polymeric material that connects and maintains the position of MOF particles within the solidified feedstock structure.

Portions of the feedstock layer as applied, that are not formed to solidified feedstock, remain as the original powder feedstock.

The build plate is moved down (114) and a second layer of the feedstock is formed (116) as a second even feedstock layer over the first feedstock layer, which includes a portion of solidified feedstock. The print head then selectively deposits a second amount of the liquid polymeric binder (104) onto portions of the second feedstock layer (118), and the second amount of the liquid binder is solidified to form solidified feedstock from the second layer, e.g., by using heat to remove solvent and form dry (solidified) polymeric binder, or by another relevant mechanism based on the type of binder composition.

Portions of the second layer that are not formed to solidified feedstock remain as the original powder feedstock.

Steps 114, 116, and 118 are repeated (120) to form a completed multi-layer MOF composite (green body) that is surrounded by the original powder feedstock (102 or 104). The multi-layer MOF composite is a multi-layer body that contains the solidified feedstock of each formed layer and is composed of the MOF particles dispersed in the solidified (solid) binder. Optionally, the multi-layer MOF composite, optionally in the presence of the surrounding original powder feedstock, can be heated to crosslink and cure the liquid polymeric binder (122), if the polymeric binder is thermally curable. The original (loose) powder feedstock (102 or 104) can be removed and separated from the multi-layer composite (124).

The multi-layer composite can be moved to a location for any subsequent type of processing that may be useful or desired to convert the green body form of the MOF composite to a derivative product, such as a MOF-type adsorbent.

FIG. 1B schematically illustrates steps of technique 100 with related process equipment and feedstock.

Referring to FIG. 1B, an example process can be performed using commercially available binder jet printing apparatus (130), feedstock (132) as described herein, and liquid (133) dispensed from a printhead (136) of the apparatus (130). According to example steps of the method, feedstock (132) is formed as an even thickness and level feedstock layer (134) over a build plate (138) of the apparatus (130). Feedstock layer (134) may be formed using a roller or other leveling device, using one pass or multiple passes to uniformly form and distribute a desired depth of feedstock (132). Print head (136) selectively deposits liquid (133) onto a portion of the first layer (134).

Liquid 133 may be, for example, a liquid binder composition (as described relative to FIG. 1B) or may be another liquid as described herein. The liquid (133), in the form a liquid binder composition, is solidified, e.g., by drying with heat to evaporate solvent of the binder and form a first solidified feedstock (140) containing solid polymer at the portion.

Portions of feedstock layer 134 that are not formed to solidified feedstock (140) remain as the original powder feedstock (132). The build plate (136) is moved down (114) and a second or subsequent feedstock layer (142) is formed over the first layer (134) and the first solidified feedstock (140). The print head (136) then selectively deposits a second amount of the liquid polymeric binder (133) onto portions of the second layer (142) and the second amount of the liquid polymeric binder (133) is solidified to form solidified feedstock from the second layer. Portions of the second layer that are not formed to solidified feedstock remain as the original powder feedstock.

This sequence of steps of applying a feedstock layer over a previous layer, and applying binder to the new feedstock layer to produce solidified feedstock of the new feedstock layer, is repeated (150) to form a completed multi-layer MOF composite ("final part") (152) surrounded by the original powder feedstock (132). The multi-layer MOF composite (152) is a body that contains the solidified feedstock of each formed layer and is composed of the MOF particles from the feedstock dispersed in the solidified (solid) polymer binder. As desired, the multi-layer MOF composite can be further processed to convert the green body form of the MOF composite into a useful material, such as a MOF-type adsorbent material.

For example, as illustrated, the multi-layer MOF composite (152), optionally in the presence of the surrounding original powder feedstock (132), can be heated to cure the liquid polymeric binder (122).

The original (loose) powder feedstock (132) can be removed and separated from the multi-layer MOF composite (152). The multi-layer composite (152) can be moved to an oven for heating to a temperature that will be effective to remove solidified binder (debind) from the multi-layer composite (152).

The technique referred to as stereolithography (SLA) is a version of additive manufacturing technology that, as now appreciated by the present Applicant and as described herein, can be used to form a multi-layer MOF composite in a layer-by-layer fashion, and using photochemical processes by which light (electromagnetic radiation) is used to selectively cause chemical monomers and oligomers (together referred to as "polymer" or "liquid polymer binder") of a layer of liquid feedstock to polymerize, cross-link, or otherwise react chemically to form a cured polymeric reaction product ("solidified polymer") of solidified feedstock of a feedstock layer. The liquid polymer binder is selectively curable by exposure to electromagnetic radiation, such as ultraviolet (UV) light. The feedstock is in liquid form and contains curable liquid polymer ("liquid polymer binder") in combination with MOF particles.

The multi-layer MOF composite is built by sequential steps of producing many thin cross sections ("solidified feedstock" of a "layer," herein) of a larger three-dimensional structure (MOF composite). A source of electromagnetic radiation (e.g., a laser) selectively applies electromagnetic radiation over a portion of a layer of the liquid feedstock, which according to the present invention contains MOF particles and liquid polymer binder that can be solidified by chemically curing upon exposure to the electromagnetic radiation. The laser selectively irradiates a portion of the layer of the liquid feedstock at a surface of the layer. The electromagnetic radiation causes the liquid polymer binder to solidify by a chemical reaction (i.e., to cure) to form solidified feedstock that contains the MOF particles and solidified (cured) polymer.

After an initial layer of solidified feedstock is formed, an additional thin layer of the liquid feedstock is deposited over the top surface of the completed layer that contains the solidified feedstock, and the process is repeated with multiple layers being formed on and adhering to a top surface of a previous layer. Multiple layers are deposited, successively, one over each completed layer, to form a multi-layer MOF composite that is a composite of each layer of solidified feedstock. After all layers of the multi-layer MOF composite have been formed, portions of the layers that contain original liquid feedstock that has not been used to prepare solidified feedstock are separated from the multi-layer MOF composite. The multi-layer MOF composite can be subsequently processed as desired to form a derivative structure, such as a MOF-type adsorbent material, e.g., by steps that include removing the solidified (cured) polymer from the MOF particles (i.e., "debinding").

Figure 2A:
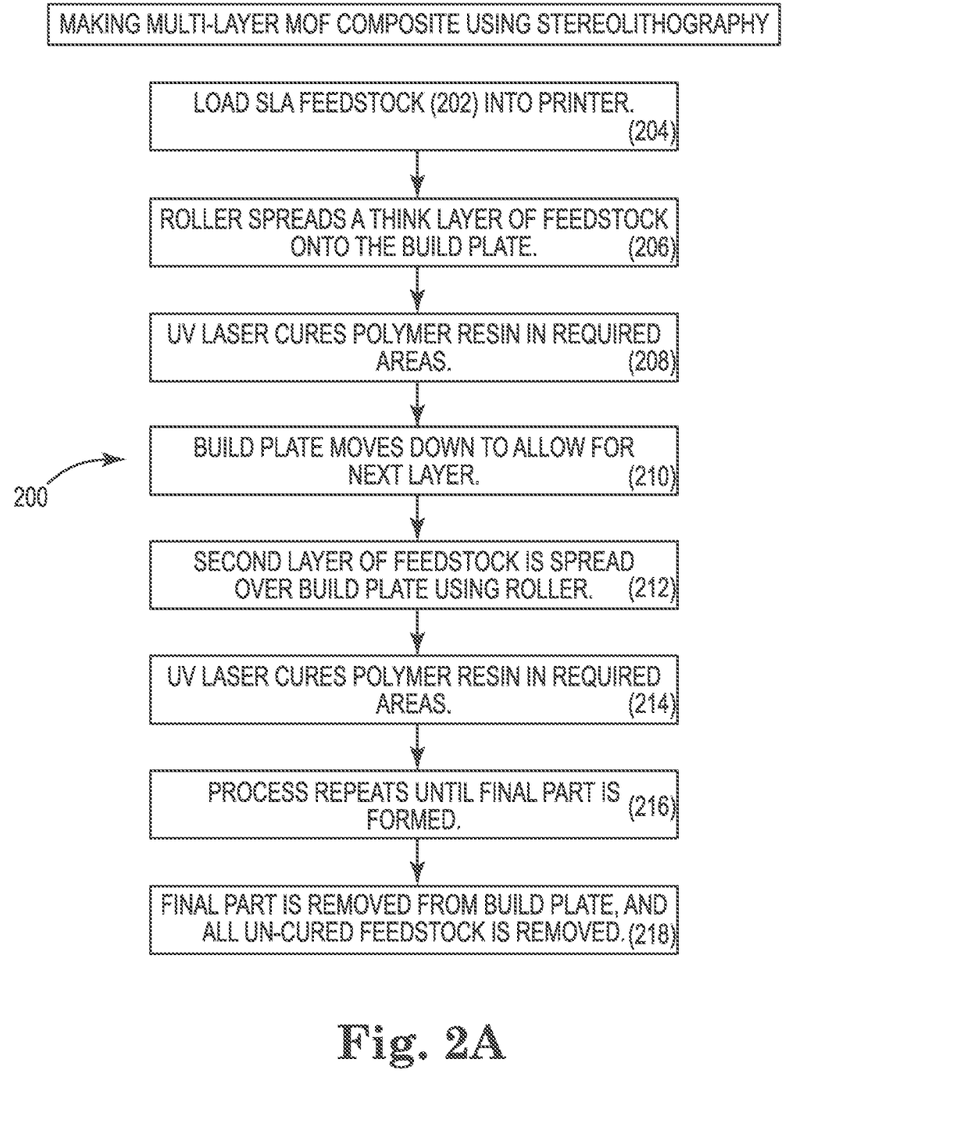

An example of a stereolithography additive manufacturing technique (200) useful for preparing a multi-layer MOF composite as described herein is shown at FIG. 2A. Feedstock 202 is a liquid that contains MOF particles in combination with a liquid curable polymer binder.

The process can be performed using commercially available stereolithography additive manufacturing equipment and liquid polymeric binder combined with the MOF particles to form feedstock. According to example steps of the example method (as shown at FIG. 2A, with steps numbered parenthetically), liquid feedstock (202) contained by an SLA additive manufacturing apparatus is formed as an even layer over a build plate of the apparatus (204, 206). In a subsequent step (208), a source of electromagnetic radiation (e.g., a UV (ultraviolet) laser) selectively irradiates a portion of this first layer with radiation of a wavelength that will chemically cure and solidify the liquid polymer binder of the feedstock. The solidified liquid polymer binder forms solidified feedstock at the irradiated portion.

Portions of the layer that are not formed to solidified feedstock remain as the original liquid feedstock.

The build plate is moved down (210) and a second layer of the liquid feedstock is formed (212) as a second even layer over the first feedstock layer and over the solidified feedstock of the first feedstock layer. The source of electromagnetic radiation then selectively irradiates a portion of the second layer (214) to solidify (cure) a portion of the second layer of liquid feedstock to form solidified feedstock at portions of the second layer. Portions of the second layer that are not formed to solidified feedstock remain as the original liquid feedstock. Steps 212, 214, and 216 are repeated (218) to form a completed multi-layer solidified feedstock composite ("final part") surrounded by the original liquid feedstock (202).

The multi-layer solidified feedstock composite is a body that contains the solidified feedstock of each formed layer and is composed of the MOF particles dispersed in the solidified (solid) polymer binder of the liquid feedstock. The original liquid feedstock (202) can be removed and separated from the multi-layer composite (218). The multi-layer MOF composite can then be further processed to form a derivative structure, such as a MOF-type adsorbent material.

Figure 2B:
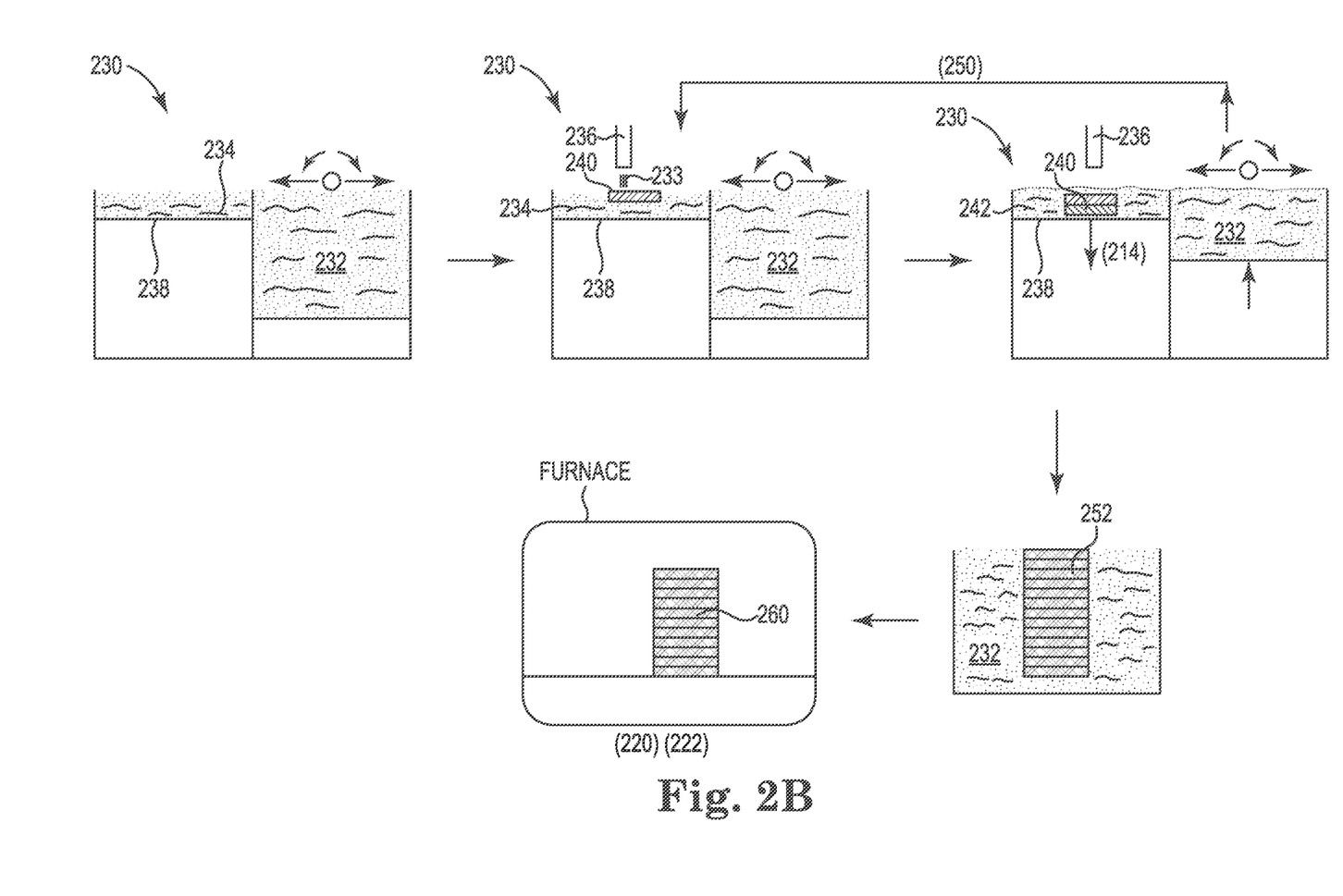

Referring to FIG. 2B, an example process can be performed using commercially available SLA apparatus (230) and using liquid feedstock (232) according to the present description. According to example steps of the method, liquid feedstock (232) is formed as an even feedstock layer (234) over a build plate (238) of the apparatus (230). Laser (236) applies electromagnetic radiation (233) to a portion of the first layer (234) to form first solidified feedstock (240) at the portion. Portions of feedstock layer (234) that are not formed to solidified feedstock (240) remain as the original liquid feedstock (232). The build plate (238) is moved down (214) and a second or subsequent liquid feedstock layer (242) is formed over the first layer (234) and the first solidified feedstock (240). The laser (236) then selectively applies electromagnetic radiation (233) to portions of the second layer (242) to form solidified feedstock from the second layer. Portions of the second layer that are not formed to solidified feedstock remain as the original liquid feedstock. The sequence is repeated (250) to form a completed multi-layer solidified feedstock composite ("final part") (252) surrounded by the original liquid feedstock (232). The multi-layer solidified feedstock composite (252) is a body that contains the solidified feedstock of each formed layer and is composed of the MOF particles from the feedstock dispersed in solidified (solid) cured polymer of the feedstock.

The original liquid feedstock (232) can be removed and separated from the multi-layer composite (252). The multi-layer composite (252) can then be further processed to form a derivative structure, such as a MOF-type adsorbent material.

As a different example of an additive manufacturing method that also uses a powder bed, and comparable steps, a technique referred herein as selective laser irradiation (SLI) can be used to form a multi-layer composite in a layer-by-layer fashion. Selective laser irradiation uses laser energy to selectively cause portions of a feedstock layer to solidify.

More specifically, a multi-layer composite may be built by sequential steps of producing many thin cross sections ("solidified feedstock" of a "layer," herein) of a larger three-dimensional structure (composite). A layer of solid (e.g., powder) feedstock is formed to include MOF particles as described, in combination with polymeric binder, for example with these ingredients being combined to form a powder. Laser energy is selectively applied to the feedstock layer over a portion of the layer. The laser energy causes the polymeric binder to solidify at the portions of the feedstock that are exposed to the laser energy. The particles may solidify by being heated and melted by the laser energy, then re-solidifying, or by a chemical reaction that is initiated by the laser energy.

After an initial layer of solidified feedstock is formed in this manner, an additional thin layer of the feedstock is deposited over the top surface of the completed layer that contains the solidified feedstock. The process is repeated to form multiple layers of the solidified feedstock, each layer being formed on top of and adhering to a top surface of a previous layer. Multiple layers are deposited, successively, one over each completed layer, to form a multi-layer composite that is a composite of each layer of solidified feedstock. The multiple layers may be of the same composition and thickness, or may be of different compositions and different layer thicknesses.

Figure 3A:
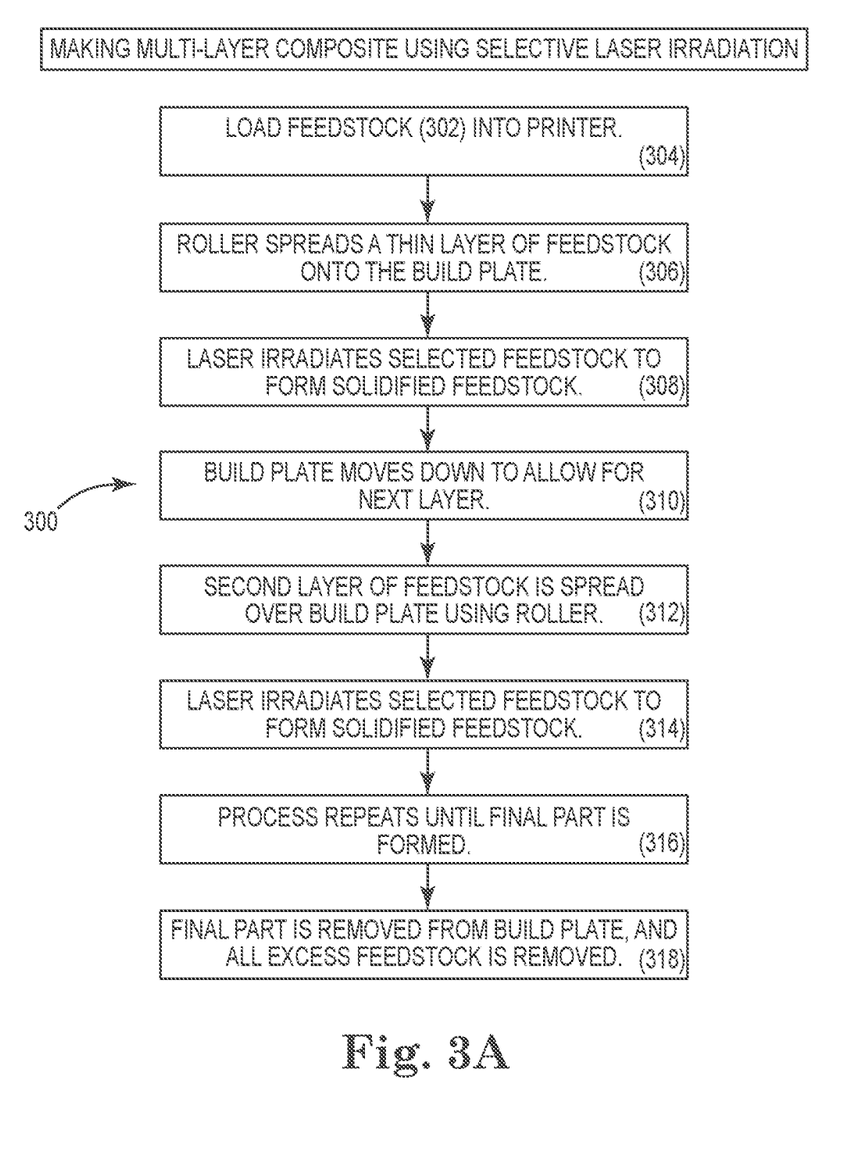

An example of a selective laser irradiation additive manufacturing technique (300) useful for preparing a multi-layer composite as described is shown at FIG. 3A. The process can be performed using commercially available additive manufacturing equipment and binder and particles to form feedstock. Feedstock 302 contains a collection of MOF particles, and binder that includes radiation-curable binder. According to example steps as shown at FIG. 3A, feedstock (302) contained by an additive manufacturing apparatus is formed as an even layer over a build plate of the apparatus (304, 306). In a subsequent step (308), a source of electromagnetic radiation (e.g., a laser) selectively irradiates a portion of this first layer of feedstock with radiation of a wavelength and energy that will cause the radiation-curable binder of the feedstock to react and harden ("solidify"). The solidified binder and MOF particles form solidified feedstock at the irradiated portion. Portions of the feedstock layer that are not formed to solidified feedstock remain as the original liquid feedstock.

The build plate is moved down (310) and a second layer of the feedstock is formed (312) as a second even layer over the first feedstock layer and over the solidified feedstock of the first feedstock layer. The source of electromagnetic radiation then selectively irradiates a portion of the second layer (314), which causes radiation-curable polymer of the feedstock at the portion to react and solidify to form solidified feedstock at the portions of the second layer. Portions of the second layer that are not formed to solidified feedstock remain as the original powder feedstock. Steps 312, 314, and 316 are repeated (318) to form a completed multi-layer solidified feedstock composite surrounded by the original feedstock (302).

The multi-layer solidified feedstock composite is a body that contains the solidified feedstock of each formed layer, and is composed of multiple continuous layers made from the material of the reacted polymeric binder and MOF particles of the feedstock. The original feedstock (302) can be removed and separated from the multi-layer composite (318).

Figure 3B:
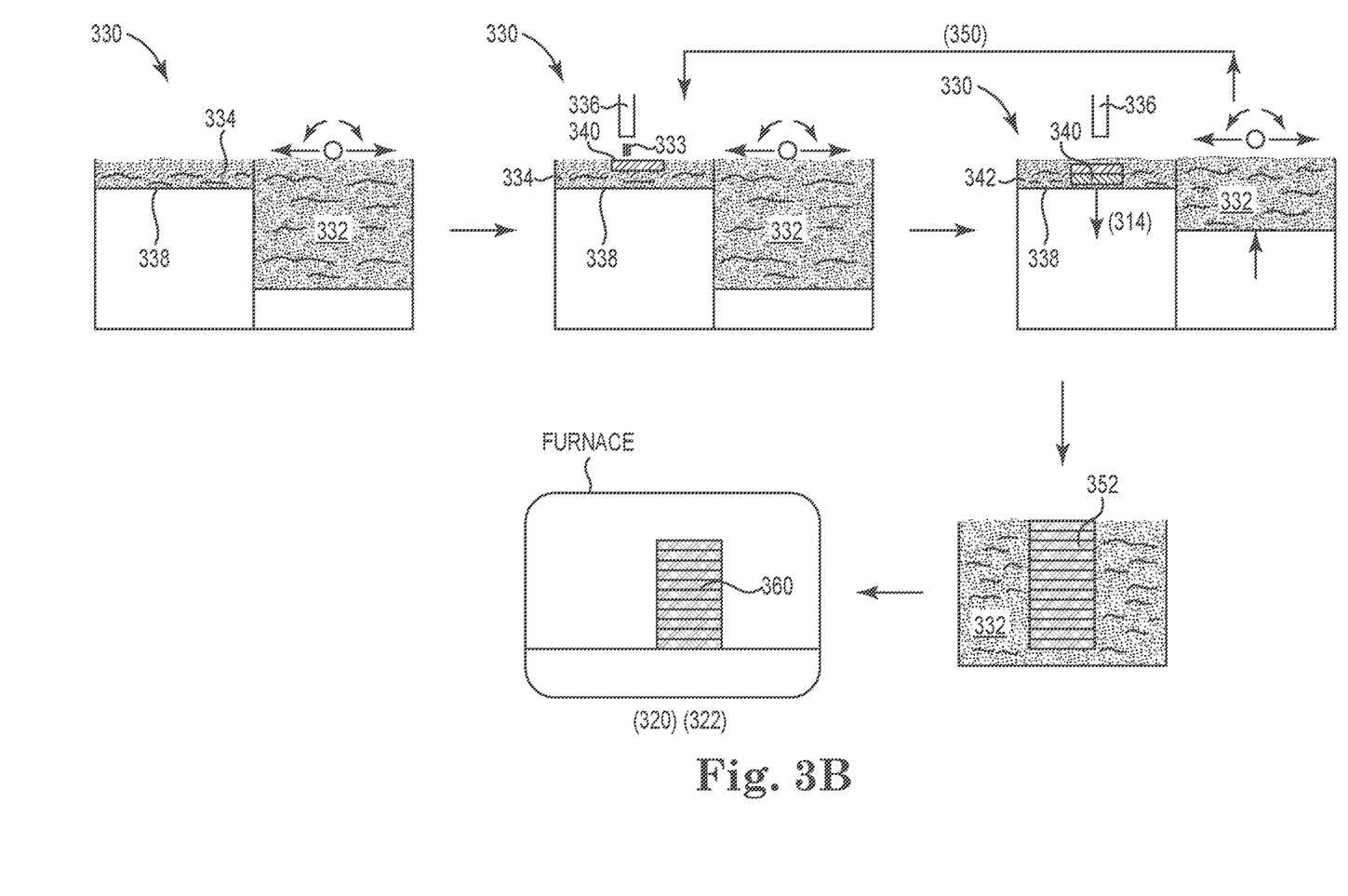
Figure 4A:
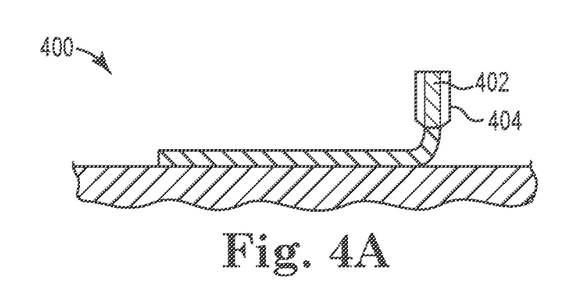
Figure 4B:
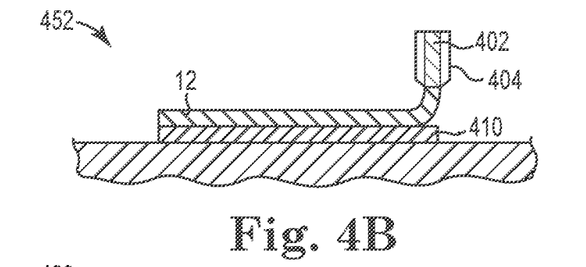
Figure 4C:
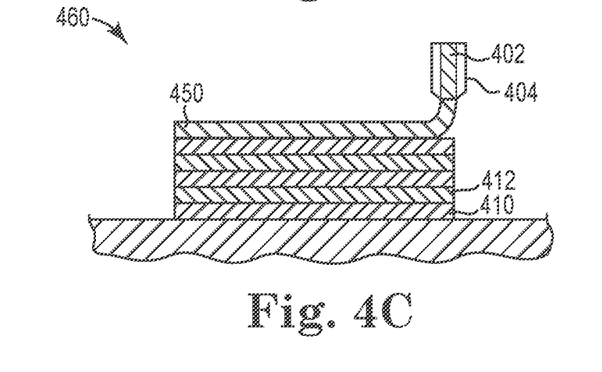

Referring to FIG. 3B, an example process can be performed using commercially available additive manufacturing apparatus (330), and feedstock (332) in the form of a powder that contains curable polymeric binder and MOF particles according to the present description. According to example steps of the method, feedstock (332) is formed as an even feedstock layer (334) over a build plate (338) of the apparatus (330). Laser (336) applies electromagnetic radiation (333) to a portion of the first layer (334), which causes radiation-curable polymer of the feedstock to react and form solidified feedstock (340) at the portion. Portions of feedstock layer (334) that are not formed to solidified feedstock (340) remain as the original feedstock (332). The build plate (338) is moved down (314) and a second or subsequent feedstock layer (342) is formed over the first layer (334) and the first solidified feedstock (340). The laser (336) then selectively applies electromagnetic radiation (333) to portions of the second layer (342), causing radiation-curable polymer of the feedstock to react and form solidified feedstock from the second layer. Portions of the second layer that are not formed to solidified feedstock remain as the original powder feedstock. The sequence is repeated (350) to form a completed multi-layer solidified feedstock composite (352) surrounded by the original feedstock (332). The multi-layer solidified feedstock composite (352) is a body that contains the solidified feedstock of each formed layer, and is composed of the material of the reacted polymerizable polymer and MOF particles of the feedstock. The original feedstock (332) can be removed and separated from the multi-layer composite (352). An example of a "feedstock dispensing" additive manufacturing technique (400) useful for preparing a multi-layer MOF composite as described herein is shown at FIGS. 4A, 4B, and 4C. Feedstock 402 is a flowable (e.g., liquid, high viscosity liquid, or "semi-solid" flowable material) that contains MOF particles in combination with a liquid curable polymer binder.

The process can be performed using commercially available additive manufacturing equipment and liquid polymeric binder combined with the MOF particles to form a semi-solid feedstock. According to example steps of the example method, semi-solid feedstock (402) is applied as a first feedstock layer by a printhead (or other useful device) (404), and is solidified to form a first solidified feedstock layer (410). The semi-solid feedstock may be in the form of a "slurry" or a "paste" that contains: a combination of one or more MOF adsorbent materials, optionally other adsorbent materials (e.g., carbon-based adsorbent material), and binder composition. Feedstock in the form of a slurry or paste is made by mixing fine particles or powder (MOF particles) with solvent to make semi-liquid form to increase the flowability of the fine solid particles of the powder.

In example feedstock materials useful in this type of method, the feedstock contains MOF in combination with a polymer. Example polymers may be thermopolymers or a radiation-curable polymers.

The feedstock may contain useful amounts of MOF and polymer, such as: an amount in a range from 40 to 90 weight percent metal organic framework adsorbent; an amount in a range from 0 to 30 weight percent non-metal organic framework adsorbent; and an amount in a range from 10 to 30 weight percent polymeric binder, based on total weight feedstock.

The feedstock may be solidified by any useful mechanism, depending on the type of liquid in the liquid feedstock material. If the liquid contains polymer that is chemically curable, the feedstock layer may be solidified by exposing the curable polymer to irradiation or heat that causes the polymer to cure. If the liquid contains thermopolymer that solidifies by exposure to a reduced temperature, the liquid may be solidified by exposure to a reduced temperature.

In a second step, as shown at FIG. 4B, a second solidified feedstock layer (412) is formed on the first solidified feedstock layer (410). Subsequent steps are used to form a desired number of added layers, including a final solidified feedstock layer (450), and to form multi-layer MOF composite 460 (see FIG. 4C).

The multi-layer composite (452) may be further processed as desired to form a derivative structure, such as a MOF-type adsorbent material.

The invention claimed is:

1. A method of additive manufacturing, the method comprising:
   obtaining a feedstock comprising at least 70% by weight of a metal organic framework adsorbent based on a total weight of the feedstock, and a solid binder;
   a) forming a first feedstock layer on a surface, the first feedstock layer comprising the feedstock;
   b) applying radiation to a portion of the first feedstock layer to form a first layer of a multilayer composite;
   c) forming a second feedstock layer over at least the first layer of the multilayer composite, the second feedstock layer comprising the feedstock; and
   d) applying radiation to a portion of the second feedstock layer to form a second layer of the multilayer composite; and
   repeating steps a)-d) to form a multilayer metal organic framework composite,
   wherein the multilayer metal organic framework composite comprises a non-denatured metal-organic framework adsorbent,
   wherein the multilayer metal organic framework composite has a density of at least 0.65 grams metal organic framework adsorbent per cubic centimeter of the multilayer metal organic framework composite, and
   wherein the multilayer metal organic framework composite adsorbs and desorbs gas.

2. The method of claim 1, wherein the solid binder comprises a thermoplastic polymer.

3. The method of claim 1, wherein the feedstock is provided in a form of a powder.

4. The method of claim 1, wherein the method does not comprise exposing the metal organic framework adsorbent to a temperature of 300° C. or greater.

5. The method of claim 1, wherein the method does not comprise exposing the metal organic framework adsorbent to a temperature of 200° C. or greater.

6. The method of claim 1, further comprising processing the multilayer metal organic framework composite into a metal organic framework adsorbent.

7. The method of claim 3, wherein the first layer of the multilayer composite and the second layer of the multilayer composite are surrounded by the feedstock.

8. The method of claim 7, further comprising removing the feedstock surrounding the first layer of the multilayer composite and the feedstock surrounding the second layer of the multilayer composite.

* * * * *